(12) United States Patent
Lee et al.

(10) Patent No.: US 9,182,847 B2
(45) Date of Patent: Nov. 10, 2015

(54) DISPLAY DEVICE WITH INTEGRATED TOUCH SCREEN AND METHOD OF DRIVING THE SAME

(71) Applicant: LG DISPAY CO., LTD., Seoul (KR)

(72) Inventors: Sung Yub Lee, Busan (KR); Sung Chul Kim, Goyang-si (KR); Seung Eun Pyo, Incheon (KR)

(73) Assignee: LG DISPLAY CO., LTD, Seoul (KR)

( * ) Notice: Subject to any disclaimer, the term of this patent is extended or adjusted under 35 U.S.C. 154(b) by 151 days.

(21) Appl. No.: 14/143,611

(22) Filed: Dec. 30, 2013

(65) Prior Publication Data

US 2014/0320427 A1    Oct. 30, 2014

(30) Foreign Application Priority Data

Apr. 30, 2013    (KR) ........................ 10-2013-0048646

(51) Int. Cl.
    *G06F 3/041*    (2006.01)
(52) U.S. Cl.
    CPC .................................... *G06F 3/0416* (2013.01)
(58) Field of Classification Search
    CPC .................................................. G06F 1/1643
    See application file for complete search history.

(56) References Cited

U.S. PATENT DOCUMENTS

| 2010/0053112 A1* | 3/2010 | Chen ................... G02F 1/13394 345/174 |
| 2010/0188439 A1* | 7/2010 | Sugimoto .............. G09G 3/342 345/690 |
| 2011/0298746 A1* | 12/2011 | Hotelling ................ G06F 3/044 345/174 |
| 2012/0050217 A1* | 3/2012 | Noguchi ............... G06F 3/0412 345/174 |
| 2012/0262390 A1* | 10/2012 | Kida et al. .............. G06F 3/041 345/173 |
| 2014/0071066 A1* | 3/2014 | Lee ........................ G06F 3/0416 345/173 |
| 2014/0145996 A1* | 5/2014 | Sugita .................... G06F 3/044 345/173 |

* cited by examiner

*Primary Examiner* — Sanghyuk Park
(74) *Attorney, Agent, or Firm* — Birch, Stewart, Kolasch & Birch, LLP (57) ABSTRACT

The display device with integrated touch screen includes a panel configured to time-division operate during first and second display durations and first and second touch durations at every frame, a touch IC configured to apply a touch scan signal to a plurality of electrodes to allow the panel to perform touch driving during the first and second touch durations, and a display driver IC configured to, when the first touch duration of an n+1st frame is started, transfer display information about the second display duration of an nth frame and display information about the first display duration of the n+1st frame to the touch IC, and when the second touch duration of the n+1st frame is started, transfer display information about the first display duration of the n+1st frame and display information about the second display duration of the n+1st frame to the touch IC.

13 Claims, 6 Drawing Sheets

DISPLAY DEVICE WITH INTEGRATED TOUCH SCREEN AND METHOD OF DRIVING THE SAME

CROSS-REFERENCE TO RELATED APPLICATIONS

This application claims the benefit of the Korean Patent Application No. 10-2013-0048646 filed on Apr. 30, 2013, which is hereby incorporated by reference as if fully set forth herein.

BACKGROUND

1. Field of the Invention

The present invention relates to a display device, and more particularly, to a display device with integrated touch screen and a method of driving the same.

2. Discussion of the Related Art

Touch screens are a type of input device that is included in image display devices such as liquid crystal display (LCD) devices, field emission displays (FEDs), plasma display panels (PDPs), electroluminescent displays (ELDs), and electrophoretic displays (EPDs), and allows a user to input predetermined information by applying a pressure (i.e., pressing or touching) to a touch sensor of a touch screen while looking at the image display device.

Particularly, the demand of display devices with integrated in-cell type touch screen, which include a plurality of built-in elements configuring the touch screen for slimming portable terminals such as smart phones and tablet personal computers (PCs), is recently increasing.

Hereinafter, driving of a general display device with integrated touch screen will be described with reference to FIG. 1.

Figure 1:
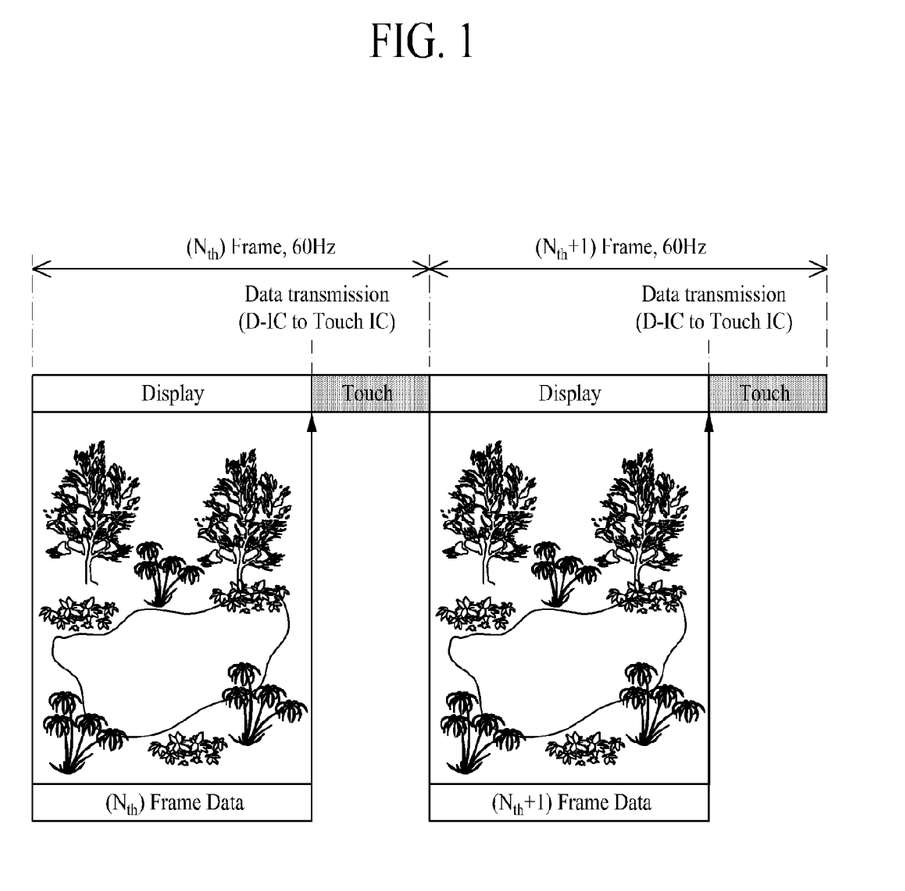
FIG. 1 is a diagram for describing a DTX compensation method of the general display device with integrated touch screen.

FIG. 1 is a diagram for describing a display-to-touch crosstalk (DTX) compensation method of the general display device with integrated touch screen.

The general display device with integrated touch screen shortens a display driving time and performs touch driving for the remaining time, in one frame (60 Hz). In other words, as illustrated in FIG. 1, the general display device temporally divides a time of 16.7 ms, and performs display driving and touch driving. For example, the display driving time is limited to 10 ms, and the remaining time of 6.7 ms is used as a touch driving time in one frame.

In such a driving scheme, if a display frame rate is 60 Hz, a touch report rate is also 60 Hz similarly. In other words, the general display device with integrated touch screen transmits touch data to a system once for each sync signal defining one frame period.

For reference, a frequency at which new data are respectively transmitted to all pixels of a panel is referred to as a display frame rate, and a frequency at which touch data obtained in a touch screen are respectively transmitted to the system is referred to as a touch report rate.

However, in the general display device with integrated touch screen, when a display pattern is changed, touch raw data are changed, and due to the change of the touch raw data, DTX that causes the change of the display pattern to be inaccurately detected as a touch input occurs.

In particular, when a black pattern (0 gray scale) is changed to a white pattern (255 gray scale), a liquid crystal capacitance difference between the black pattern and the white pattern is large, easily causing DTX.

In order to remove DTX, the general display device with integrated touch screen compensates for the touch raw data by using a compensation value, which is stored in a lookup table (LUT), on the basis of data transferred from a display driver integrated chip (IC) to a touch IC.

In other words, as illustrated in FIG. 1, display information (which is displayed during one frame) of an nth frame is transferred from the display driver IC to the touch IC, and when performing touch driving of the nth frame, the touch raw data are compensated for by using the compensation value stored in the lookup table (LUT).

However, the above-described compensation method cannot obtain the touch report rate equal to or higher than the display frame rate. Also, the touch report rate higher than a frequency of 60 Hz is needed for increasing a performance of the touch screen, but a general driving scheme cannot secure the touch report rate equal to or higher than the display frame rate, and has a limitation in increasing a touch performance.

SUMMARY

Accordingly, the present invention is directed to provide a display device with integrated touch screen and a method of driving the same that substantially obviate one or more problems due to limitations and disadvantages of the related art.

An aspect of the present invention is directed to a display device with integrated touch screen, which can increase a touch report rate to higher than a display frame rate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a panel configured to time-division operate during a first display duration, a first touch duration, a second display duration, and a second touch duration at every frame; a touch IC configured to apply a touch scan signal to a plurality of electrodes to allow the panel to perform touch driving during the first and second touch durations; and a display driver IC configured to, when the first touch duration of an n+1st frame is started, transfer display information about the second display duration of an nth frame and display information about the first display duration of the n+1st frame to the touch IC, and when the second touch duration of the n+1st frame is started, transfer display information about the first display duration of the n+1st frame and display information about the second display duration of the n+1st frame to the touch IC, wherein the touch IC compensates for a touch sensitivity by using the transferred display information about the first and second display duration.

In another aspect of the present invention, there is provided a method of driving a display device with integrated touch screen, including: a panel that time-division operates during a first display duration, a first touch duration, a second display duration, and a second touch duration at every frame; a touch IC that applies a touch scan signal to a plurality of electrodes to allow the panel to perform touch driving during the first and second touch durations; and a display driver IC that applies a common voltage to the plurality of electrodes to allow the panel to perform display driving during the first and second display durations, including: when the first touch duration of an n+1st frame is started, by the display driver IC, transferring display information about the second display duration of an nth frame and display information about the first display duration of the n+1st frame to the touch IC; during the first touch duration of the n+1st frame, by the touch IC, compensating for a touch sensitivity by using the display information about the second display duration of the nth frame and the display information about the first display duration of the n+1st frame; when the second touch duration of the n+1st frame is started, by the display driver IC, transferring display information about the first display duration of the n+1st frame and display information about the second display duration of the n+1st frame to the touch IC; and during the second touch duration of the n+1st frame, by the touch IC, compensating for the touch sensitivity by using the display information about the first display duration of the n+1st frame and the display information about the second display duration of the n+1st frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2:
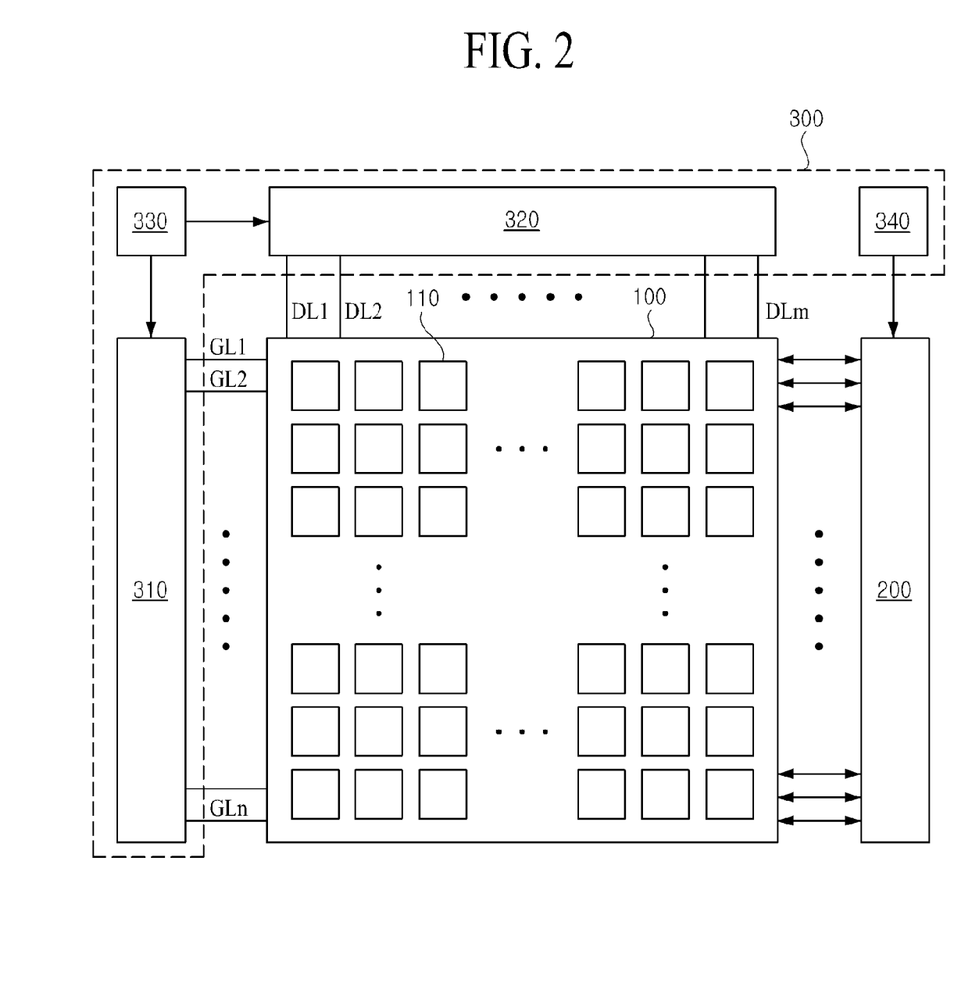
FIG. 2 is a diagram illustrating a configuration of a display device with integrated touch screen according to an embodiment of the present invention.

FIG. 2 is a diagram illustrating a configuration of a display device with integrated touch screen according to an embodiment of the present invention.

The display device with integrated touch screen according to an embodiment of the present invention, as illustrated in FIG. 2, includes a panel 100, a touch integrated chip (IC) 200, and a display driver IC 300.

The panel 100 includes a built-in touch screen (not shown), which senses a touch position of a user. In particular, the touch screen is an in-cell type touch screen using a self-capacitive type.

The panel 100 of the touch screen according to an embodiment of the present invention may be configured as a type in which a liquid crystal layer is formed between two substrates. In this case, a plurality of gate lines GL1 to GLn, a plurality of data lines DL1 to DLm intersecting the plurality of gate lines, a plurality of thin film transistors (TFTs) respectively formed in a plurality of pixel areas defined by intersects of the data lines and gate lines, and a plurality of pixels (which are arranged in a matrix type due to an intersection structure of the data lines and gate lines) are disposed on a lower substrate of the panel 100.

The panel 100 includes a plurality of electrodes 110. When a common voltage is applied for display driving of the panel 100, the plurality of electrodes 110 act as common electrodes that drive a liquid crystal along with a plurality of pixel electrodes respectively formed in the plurality of pixels. When a touch scan signal is applied for touch sensing, the electrodes 110 act as touch electrodes that sense a touch position.

In other words, the plurality of electrodes 110 operates as the common electrodes during a display period in which display driving is performed, and during a touch period in which touch driving is performed, the electrodes 110 operate as the touch electrodes.

The plurality of electrodes 110 are connected to the touch IC 200 and the display driver IC 300 through a plurality of lines (not shown). For example, the electrodes 110 receive the touch scan signal, which is applied from the touch IC 200 through the plurality of lines, and the common voltage applied from the display driver IC 300.

During the touch period, the touch IC 200 applies the touch scan signal to the plurality of electrodes 110 to allow the panel 100 to perform touch driving. In other words, during first and second touch periods, the touch IC 200 applies the touch scan signal to the plurality of electrodes 110 to allow the panel 100 to perform the touch driving.

The touch IC 200 according to an embodiment of the present invention may include a touch scan signal generator that generates the touch scan signal which is applied to the plurality of electrodes 110 of the panel 100 for the touch sensing. The touch scan signal may be a touch driving voltage, which may have a value greater than the common voltage applied to the plurality of electrodes 110 of the panel 100 for the display driving. Here, the touch driving voltage may have a voltage corresponding to the common voltage as a low-level voltage, and have a voltage higher than the common voltage as a high-level voltage.

Moreover, the touch IC 200 may include a touch sensing unit that receives a plurality of touch sensing signals respectively generated from the plurality of electrodes 110 according to the touch scan signal, and calculates touch coordinates by using the received touch sensing signals to sense a touch of a user. Here, the calculated touch coordinates may be transferred to a system (not shown), thereby enabling the panel 100 to recognize the touch coordinates of the user.

Although described below, when sensing a touch, the touch IC 200 compensates for a touch sensitivity by using display information transferred from a memory 340 included in the display driver IC 300.

The display driver IC 300, as illustrated in FIG. 2, includes a gate driver 310, a data driver 320, a timing controller 330, and the memory 340.

The gate driver 310 sequentially supplies a gate signal to the gate lines of the panel 100 during the display period. In particular, the gate driver 310 applies the gate signal to the gate lines of the panel 100 during a first display period and a second display period.

In other words, the gate driver 310 supplies the gate signal to the gate lines GL1 to GLn to allow data voltages to be respectively applied to the pixels of the panel 100 during the first and second display periods.

For example, the gate driver 310 may supply the gate signal to the gate lines GL1 to GLn to select data lines of the panel 100 to which data voltages are respectively applied, and in response to the gate signal, the pixels of the panel 100 may be respectively charged with the data voltages input from the data driver 320 during the first and second display periods.

Here, the gate driver 310 may selectively supply the gate signal to the gate lines. As an example, the gate driver 310 may apply the gate signal to odd-numbered gate lines during the first display period, and during the second display period, the gate driver 310 may apply the gate signal to even-numbered gate lines. As another example, the gate driver 310 may apply the gate signal from a first gate line to a nth/2 gate line during the first display period, and during the second display period, the gate driver 310 may apply the gate signal from a (n/2)+1st gate line to an nth gate line.

The gate driver 310 applied to the present invention may be provided independent of the panel 100, and may be electrically connected to the panel 100 in various schemes. However, the gate driver 310 may be provided as a gate-in panel (GIP) type which is provided at the panel 100 along with the TFTs of the pixels. In this case, examples of a gate control signal for controlling the gate driver 310 may include a start signal and at least one gate clock.

The data driver 320 converts RGB data, input from the timing controller 330, into data voltages to output the data voltages. The data voltages output from the data driver 320 are respectively supplied to the data lines DL1 to DLm.

In other words, the data driver 320 shifts a source start pulse according to a source shift clock to generate a sampling signal. The data driver 320 latches pixel data (RGB, image data) (which are input according to the source shift clock) according to the sampling signal, converts the latched pixel data into data signals, and respectively supplies the data signals to the data lines in units of a horizontal line in response to a source output enable signal. Here, each of the data signals includes a data voltage.

To this end, the data driver 320 may include a data sampler, a latch, a digital-to-analog converter (DAC), and an output buffer.

The timing controller 330 receives a timing signal (including a vertical sync signal, a horizontal sync signal, a data enable signal, and a main clock) from the system (not shown) to generate control signals used to respectively control operation timings of the gate driver 310 and data driver 320. Also, the timing controller 330 realigns RGB data input from the system (not shown), and outputs the realigned RGB data to the data driver 320.

For reference, the vertical sync signal is a signal defining one frame period. Therefore, one period of the vertical sync signal is set to the one frame period. Also, the horizontal sync signal is a signal defining one horizontal period that is necessary to apply data to pixels included in one horizontal line in a pixel array of the panel 100. Thus, one period of the horizontal sync signal is set to the one horizontal period, which is calculated by dividing the one frame period by the number of lines of the panel 100. The data enable signal is a signal defining a period in which effective data are input, and one period of the data enable signal is set to the one horizontal period like the horizontal sync signal. The main clock is synchronized with bits of the RGB data.

The memory 340 stores display information about the first display period and display information about the second display period, and transfers the stored display information to the touch IC 200.

In detail, the memory 340 stores display information which is necessary for the touch IC 200 to compensate for DTX during one frame. When a touch period is started, the memory 340 transfers the display information to the touch IC 200 to enable the touch IC 200 to compensate for the DTX.

The system (not shown) transfers RGB data and the timing signals (including a vertical sync signal, a horizontal sync signal, a data enable signal, and a main clock) to the timing controller 330, and executes a program, associated with a touch coordinate value, which enables the panel 100 to recognize touch coordinates transferred from the touch IC 200.

As described above, the system is provided outside the display driver IC 300 and the touch IC 200, and controls overall system driving, such as the display driving and the touch driving, of the display device with integrated touch screen.

Hereinafter, a driving method and a DTX compensation method of a display device with integrated touch screen according to an embodiment of the present invention will be described in detail with reference to FIGS. 3 and 4.

Figure 3:
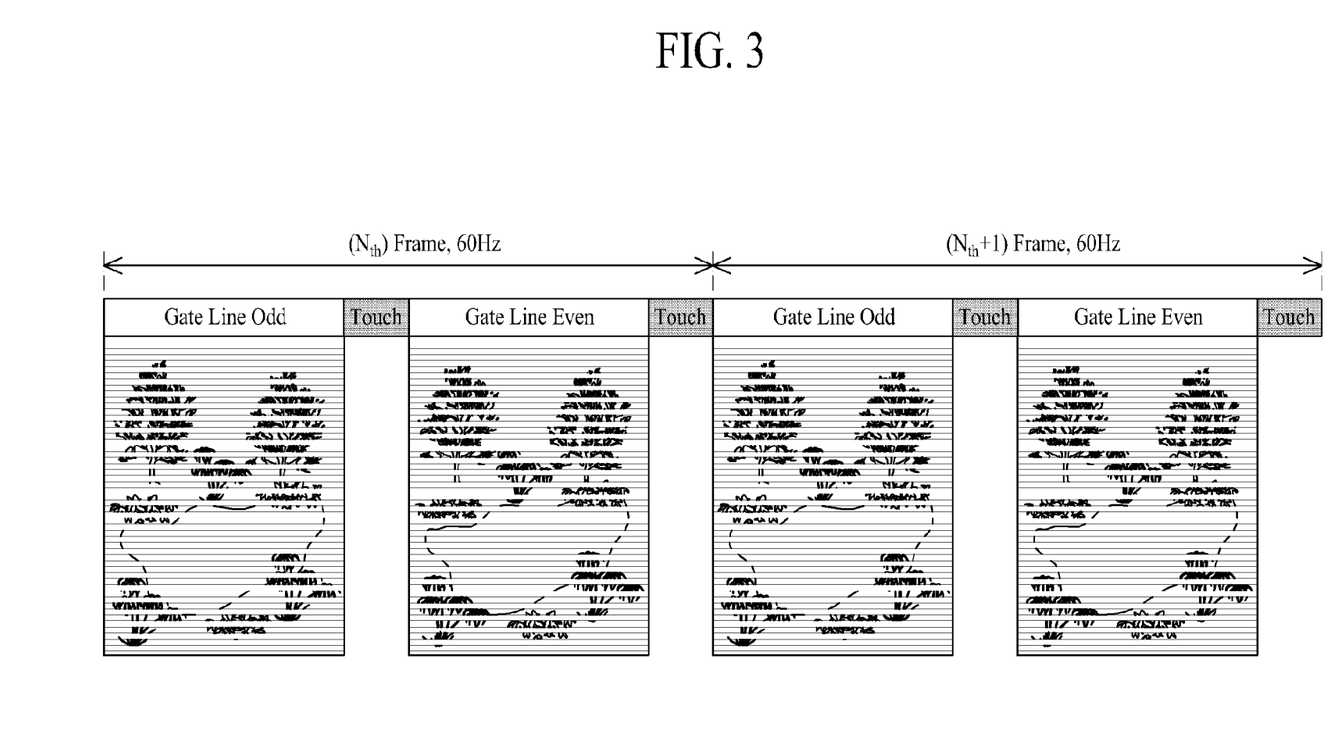
FIG. 3 is a diagram illustrating a method of driving a display device with integrated touch screen according to an embodiment of the present invention.
Figure 4:
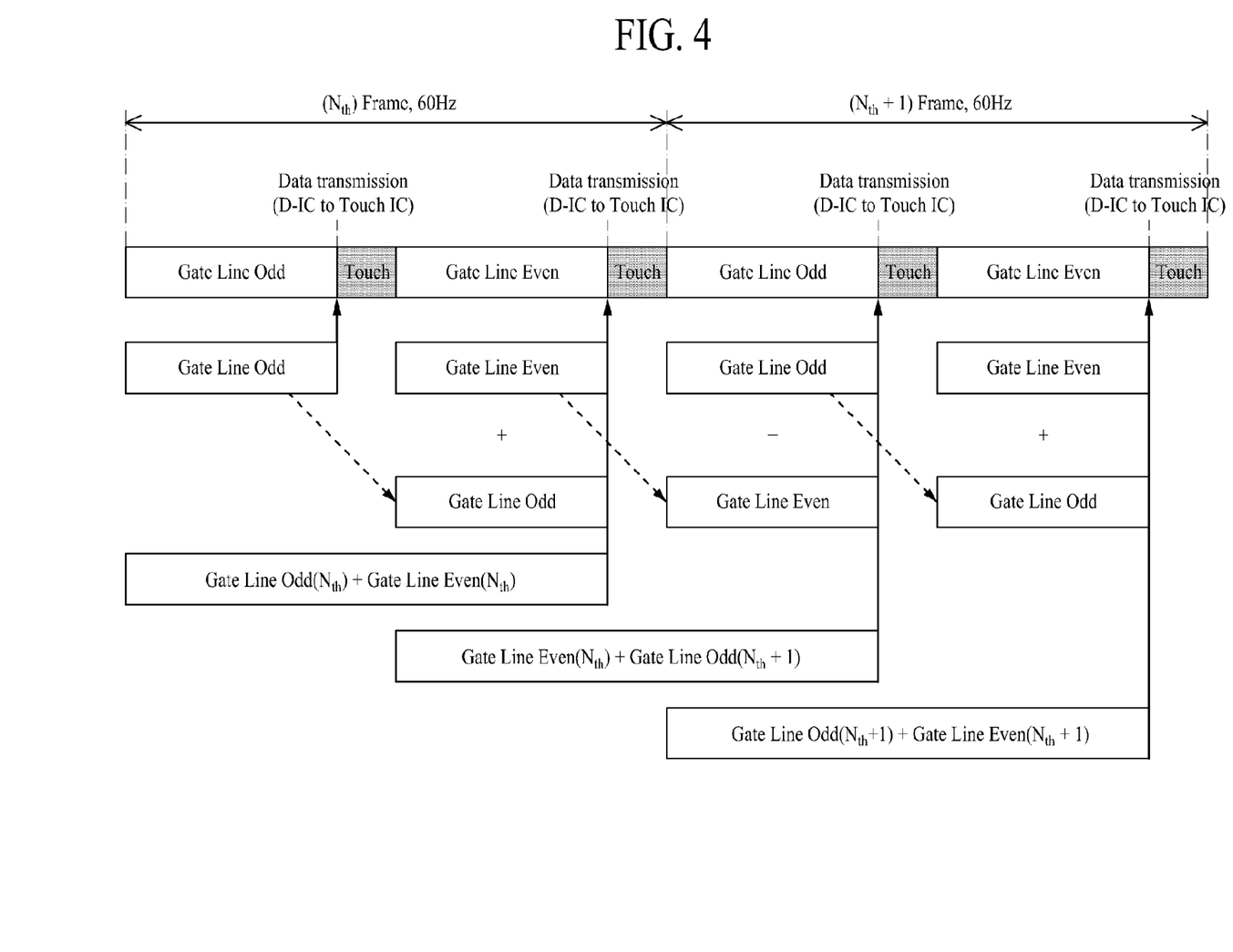
FIG. 4 is a diagram illustrating a DTX compensation method of a display device with integrated touch screen according to an embodiment of the present invention.

FIG. 3 is a diagram illustrating a method of driving a display device with integrated touch screen according to an embodiment of the present invention, and FIG. 4 is a diagram illustrating a DTX compensation method of a display device with integrated touch screen according to an embodiment of the present invention.

First, as illustrated in FIG. 3, in the driving method according to an embodiment of the present invention, one frame (60 Hz) is time-divided into a total of four durations, and is driven. For example, if a driving time of the one frame (60 Hz) is 16.7 ms, the one frame is time-divided into a first display duration of 5 ms, a first touch duration of 3.35 ms, a second display duration of 5 ms, and a second touch duration of 3.35 ms, and is driven. However, the time of the display duration and the time of the touch duration may be adjusted depending on a driving environment.

In other words, the one frame is time-divided into the first display duration in which the gate signal is applied to the odd-numbered gate lines (1, 3, 5, . . . , n−1), the first touch duration in which a touch input is checked by applying the touch scan signal to the panel 100, the second display duration in which the gate signal is applied to the even-numbered gate lines (2, 4, 6, . . . , n), and the second touch duration in which the touch input is checked by applying the touch scan signal to the panel 100 similarly to the first touch duration, and is driven.

For example, during the first display duration, the display driver IC 300 applies the common voltage to the plurality of electrodes 110 and applies the gate signal to the odd-numbered gate lines to cause the display driving of the odd-numbered gate lines of the panel 100, and during the first touch duration, the touch IC 200 applies the touch scan signal to the electrodes 110 of the panel 100 to allow the panel to perform the touch driving. During the second display duration, the display driver IC 300 applies the common voltage to the plurality of electrodes 110 and applies the gate signal to the even-numbered gate lines to cause the display driving of the even-numbered gate lines of the panel 100, and during the second touch duration, the touch IC 200 applies the touch scan signal to the electrodes 110 of the panel 100 to allow the panel to perform the touch driving.

For reference, although not shown in FIG. 3, in each frame, a previous display duration is the first display duration, and a next display duration is the second display duration. Similarly, in each frame, a previous touch duration is the first touch duration, and a next touch duration is the second touch duration.

In the above-described driving method, if the display frame rate is 60 Hz, the panel 100 is touched twice during one frame, and thus, the touch report rate is close to 120 Hz. Also, a display sensitivity felt by a user does hardly differ from the existing touch sensitivity, but the touch report rate is twice higher than the existing touch report rate.

In the display device with integrated touch screen according to an embodiment of the present invention, the number of times the touch scan signal is applied to all the electrodes 110 of the panel 100 during one frame increases compared to general display devices with integrated touch screen. Therefore, during one frame, the touch report rate of the touch sensing signal is maintained higher than the display frame rate, and moreover, by maintaining a high touch report rate, a touch input or dragging can be more accurately detected.

In the DTX compensation method according to an embodiment of the present invention, as illustrated in FIG. 4, when the first touch duration of an n+1st frame is started, the display driver IC 300 transfers display information about the second display duration of an nth frame and display information about the first display duration of the n+1st frame to the touch IC 200. When the second touch duration of the n+1st frame is started, the display driver IC 300 transfers display information about the first display duration of the n+1st frame and display information about the second display duration of the n+1st frame to the touch IC 200. The touch IC 200 compensates for a touch sensitivity by using the transferred display information about the first and second display durations.

For example, when the first touch duration of the n+1st frame is started, the display driver IC 300 transfers display information (which is obtained by applying the gate signal to the even-numbered gate lines of the nth frame) and display information (which is obtained by applying the gate signal to the odd-numbered gate lines of the n+1st frame) to the touch IC 200, and the touch IC 200 compensates for touch sensitivities of the plurality of electrodes 110 by using the transferred display information (which is obtained by applying the gate signal to the even-numbered gate lines of the nth frame) and the transferred display information (which is obtained by applying the gate signal to the odd-numbered gate lines of the n+1st frame).

Moreover, when the second touch duration of the n+1st frame is started, the display driver IC 300 transfers display information (which is obtained by applying the gate signal to the odd-numbered gate lines of the n+1st frame) and display information (which is obtained by applying the gate signal to the even-numbered gate lines of the n+1st frame) to the touch IC 200, and the touch IC 200 compensates for the touch sensitivities of the plurality of electrodes 110 by using the transferred display information (which is obtained by applying the gate signal to the odd-numbered gate lines of the n+1st frame) and the transferred display information (which is obtained by applying the gate signal to the even-numbered gate lines of the n+1st frame).

When performing the above-described compensation, the touch IC 200 compensates for DTX of each of the plurality of electrodes 110 by using an average value of received display information about one frame.

In more detail, the touch IC 200 analyzes an average value of display information based on luminance information about the pixels to calculate an average touch data correction value (a touch data error value), and reflects the average touch data correction value in sensed touch raw data, thereby compensating for DTX caused by a change in a screen. Also, when determining whether a position having a large luminance change is touched, the touch IC 200 reflects a touch data correction value mapped to a lookup table (not shown) to adjust touch reference data.

That is, a capacitance unexpectedly changed by a screen change is compensated for by referring to touch correction data, which correspond to luminance and are input to the touch IC 200, from the lookup table.

Here, depending on a design, the lookup table may be included in the touch IC 200 or the display driver IC 300, or may be provided outside the touch IC 200 and the display driver IC 300.

Hereinafter, a driving method and a DTX compensation method of a display device with integrated touch screen according to another embodiment of the present invention will be described in detail with reference to FIGS. 5 and 6.

Figure 5:
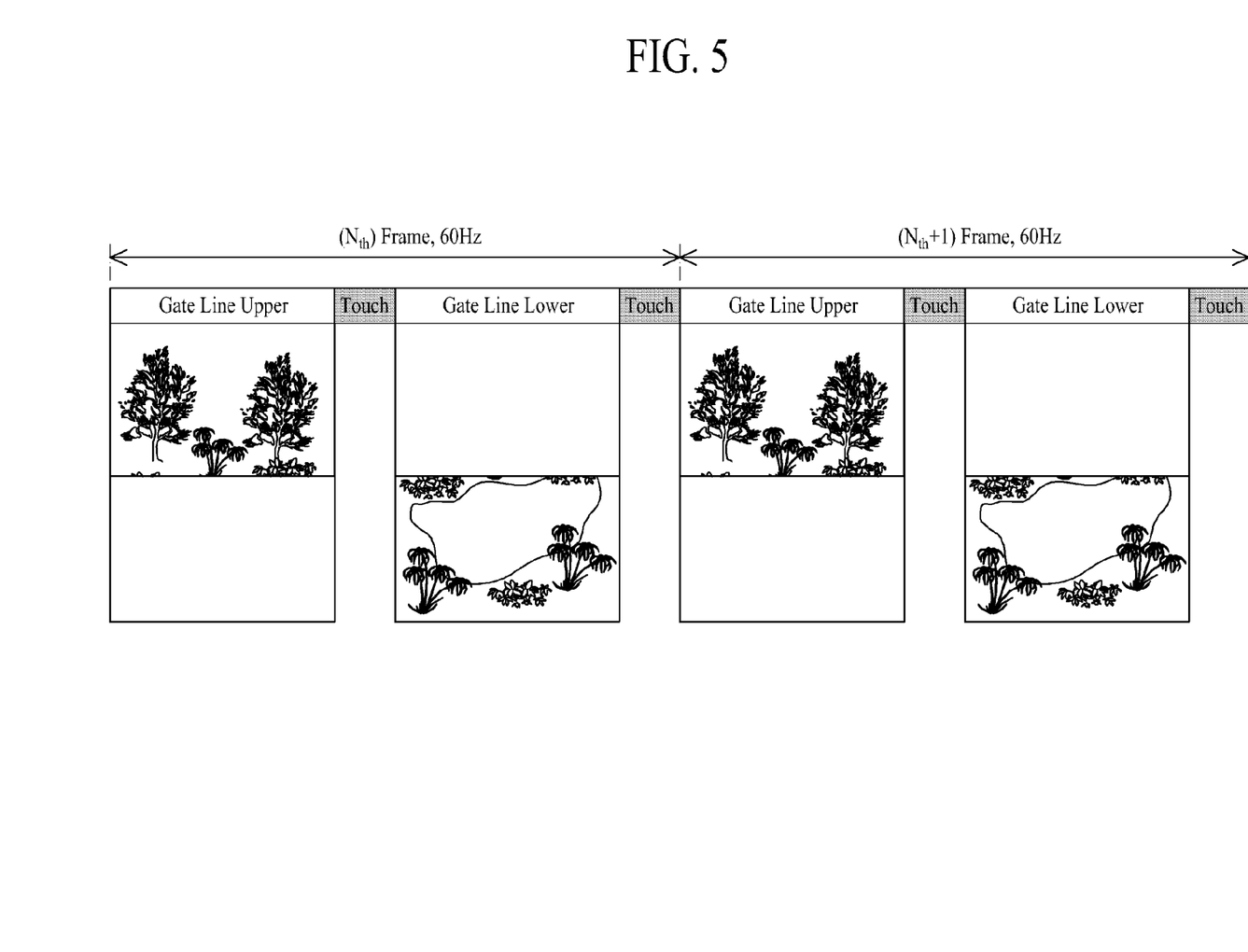
FIG. 5 is a diagram illustrating a method of driving a display device with integrated touch screen according to another embodiment of the present invention.
Figure 6:
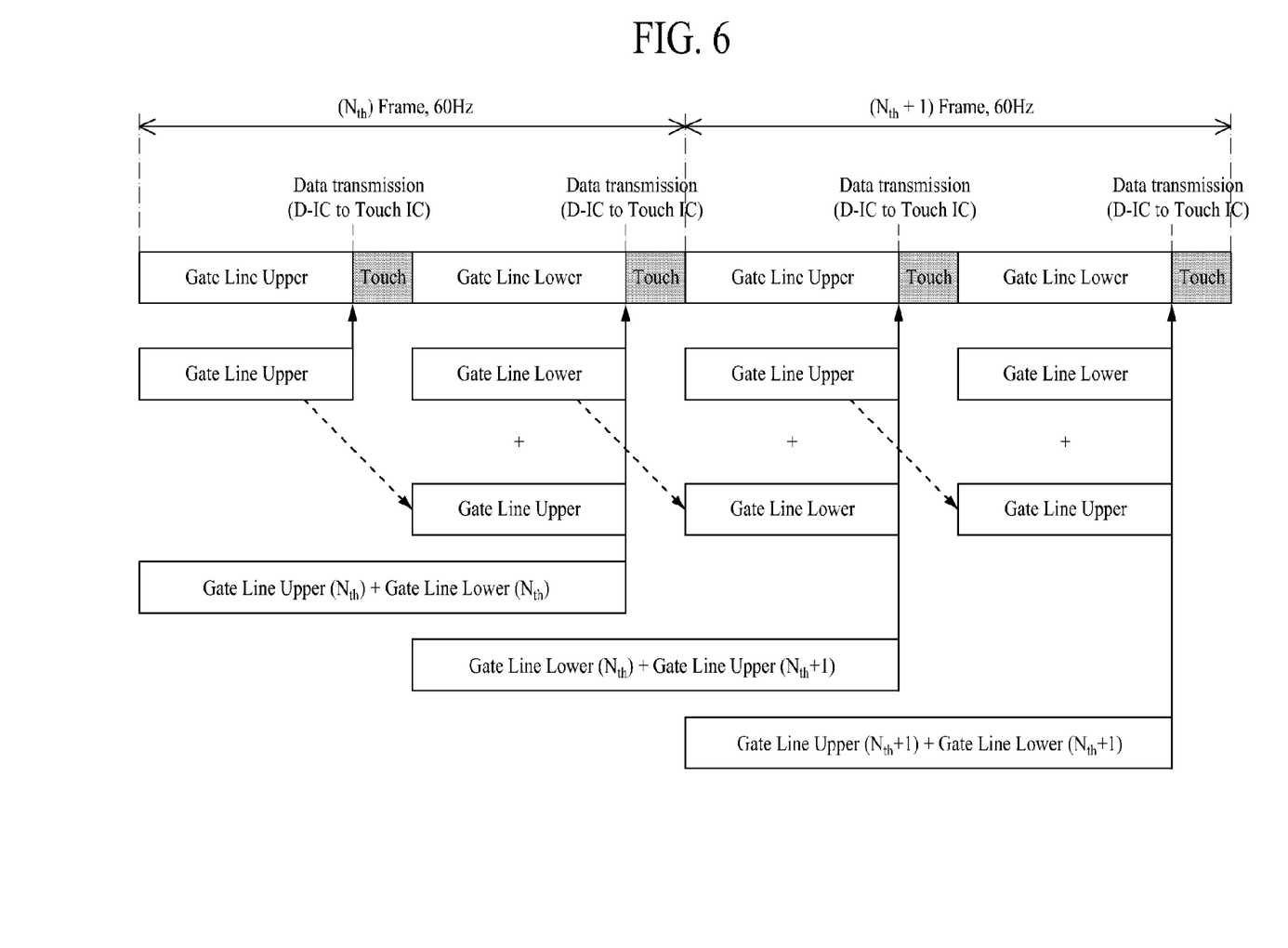
FIG. 6 is a diagram illustrating a DTX compensation method of a display device with integrated touch screen according to another embodiment of the present invention.

FIG. 5 is a diagram illustrating a method of driving a display device with integrated touch screen according to another embodiment of the present invention, and FIG. 6 is a diagram illustrating a DTX compensation method of a display device with integrated touch screen according to another embodiment of the present invention.

First, as illustrated in FIG. 5, in the driving method according to another embodiment of the present invention, one frame (60 Hz) is time-divided into a total of four durations, and is driven.

In other words, the one frame is time-divided into a first display duration in which the gate signal is applied to upper gate lines, a first touch duration in which a touch input is checked by applying the touch scan signal to the panel 100, a second display duration in which the gate signal is applied to lower gate lines, and a second touch duration in which the touch input is checked by applying the touch scan signal to the panel 100 similarly to the first touch duration, and is driven. Here, the upper gate lines are the first to nth/2 gate lines, and the lower gate lines are the (n/2)+1st to nth gate lines.

For example, during the first display duration, the display driver IC 300 applies the common voltage to the plurality of electrodes 110 and applies the gate signal to the upper gate lines to cause the display driving of the upper gate lines of the panel 100, and during the first touch duration, the touch IC 200 applies the touch scan signal to the electrodes 110 of the panel 100 to allow the panel to perform the touch driving. During the second display duration, the display driver IC 300 applies the common voltage to the plurality of electrodes 110 and applies the gate signal to the lower gate lines to cause the display driving of the lower gate lines of the panel 100, and during the second touch duration, the touch IC 200 applies the touch scan signal to the electrodes 110 of the panel 100 to allow the panel to perform the touch driving.

For reference, although not shown in FIG. 5, in each frame, a previous display duration is the first display duration, and a next display duration is the second display duration. Similarly, in each frame, a previous touch duration is the first touch duration, and a next touch duration is the second touch duration.

In the above-described driving method, if the display frame rate is 60 Hz, the panel 100 is touched twice during one frame, and thus, the touch report rate is close to 120 Hz. Also, a display sensitivity felt by a user does hardly differ from the existing touch sensitivity, but the touch report rate is twice higher than the existing touch report rate.

In the display device with integrated touch screen according to an embodiment of the present invention, the number of times the touch scan signal is applied to all the electrodes 110 of the panel 100 during one frame increases compared to general display devices with integrated touch screen. Therefore, during one frame, the touch report rate of the touch sensing signal is maintained higher than the display frame rate, and moreover, by maintaining a high touch report rate, a touch input or dragging can be more accurately detected.

In the DTX compensation method according to an embodiment of the present invention, as illustrated in FIG. 6, when the first touch duration of an n+1st frame is started, the display driver IC 300 transfers display information about the second display duration of an nth frame and display information about the first display duration of the n+1st frame to the touch IC 200. When the second touch duration of the n+1st frame is started, the display driver IC 300 transfers display information about the first display duration of the n+1st frame and display information about the second display duration of the n+1st frame to the touch IC 200. The touch IC 200 compensates for a touch sensitivity by using the transferred display information about the first and second display durations.

For example, when the first touch duration of the n+1st frame is started, the display driver IC 300 transfers display information (which is obtained by applying the gate signal to the lower gate lines of the nth frame) and display information (which is obtained by applying the gate signal to the upper gate lines of the n+1st frame) to the touch IC 200, and the touch IC 200 compensates for touch sensitivities of the plurality of electrodes 110 by using the transferred display information (which is obtained by applying the gate signal to the lower gate lines of the nth frame) and the transferred display information (which is obtained by applying the gate signal to the upper gate lines of the n+1st frame).

Moreover, when the second touch duration of the n+1st frame is started, the display driver IC 300 transfers display information (which is obtained by applying the gate signal to the upper gate lines of the n+1st frame) and display information (which is obtained by applying the gate signal to the lower gate lines of the n+1st frame) to the touch IC 200, and the touch IC 200 compensates for the touch sensitivities of the plurality of electrodes 110 by using the transferred display information (which is obtained by applying the gate signal to the upper gate lines of the n+1st frame) and the transferred display information (which is obtained by applying the gate signal to the lower gate lines of the n+1st frame).

When performing the above-described compensation, the touch IC 200 compensates for DTX of each of the plurality of electrodes 110 by using an average value of received display information about one frame.

In more detail, the touch IC 200 analyzes an average value of display information based on luminance information about the pixels to calculate an average touch data correction value (a touch data error value), and reflects the average touch data correction value in sensed touch raw data, thereby compensating for DTX caused by a change in a screen. Also, when determining whether a position having a large luminance change is touched, the touch IC 200 reflects a touch data correction value mapped to a lookup table (not shown) to adjust touch reference data. That is, a capacitance unexpectedly changed by a screen change is compensated for by referring to touch correction data, which correspond to luminance and are input to the touch IC 200, from the lookup table.

Here, depending on a design, the lookup table may be included in the touch IC 200 or the display driver IC 300, or may be provided outside the touch IC 200 and the display driver IC 300.

Hereinafter, a driving method of a display device with integrated touch screen according to various embodiments of the present invention will be described in detail.

The display device with integrated touch screen according to various embodiments of the present invention includes: a panel that time-division operates during a first display duration, a first touch duration, a second display duration, and a second touch duration at every frame; a touch IC that applies a touch scan signal to a plurality of electrodes to allow the panel to perform touch driving during the first and second touch durations; and a display driver IC that applies a common voltage to the plurality of electrodes to allow the panel to perform display driving during the first and second display durations.

The driving method of the display device with integrated touch screen includes an operation in which when the first touch duration of an n+1st frame is started, the display driver IC transfers display information about the second display duration of an nth frame and display information about the first display duration of the n+1st frame to the touch IC.

Subsequently, the driving method includes an operation in which during the first touch duration of the n+1st frame, the touch IC compensates for a touch sensitivity by using the display information about the second display duration of the nth frame and the display information about the first display duration of the n+1st frame. Here, the touch IC compensates for DTX of each of the plurality of electrodes by using an average value of the transferred display information.

Subsequently, the driving method includes an operation in which when the second touch duration of the n+1st frame is started, the display driver IC transfers display information about the first display duration of the n+1st frame and display information about the second display duration of the n+1st frame to the touch IC.

Subsequently, the driving method includes an operation in which during the second touch duration of the n+1st frame, the touch IC compensates for the touch sensitivity by using the display information about the first display duration of the n+1st frame and the display information about the second display duration of the n+1st frame. Here, the touch IC compensates for DTX of each of the plurality of electrodes by using an average value of the transferred display information.

In the display device with integrated touch screen according to various embodiments of the present invention, the first display duration may be a duration in which a gate signal is applied to odd-numbered gate lines, and the second display duration may be a duration in which the gate signal is applied to even-numbered gate lines. Also, the first display duration may be a duration in which the gate signal is applied to first to nth/2 gate lines, and the second display duration may be a duration in which the gate signal is applied to (n/2)+1st to nth gate lines.

In the above-described driving method, if the display frame rate is 60 Hz, the panel 100 is touched twice during one frame, and thus, the touch report rate is close to 120 Hz. Also, a display sensitivity felt by a user does hardly differ from the existing touch sensitivity, but the touch report rate is twice higher than the existing touch report rate.

In the display device with integrated touch screen according to an embodiment of the present invention, the number of times the touch scan signal is applied to all the electrodes 110 of the panel 100 during one frame increases compared to general display devices with integrated touch screen. Therefore, during one frame, the touch report rate of the touch sensing signal is maintained higher than the display frame rate, and moreover, by maintaining a high touch report rate, a touch input or dragging can be more accurately detected.

According to various embodiments of the present invention, the display device can increase the touch report rate to higher than the display frame rate.

Moreover, according to various embodiments of the present invention, the display device can maintain a high touch report rate, thus accurately detecting a touch input or dragging.

Moreover, according to various embodiments of the present invention, a touch performance can further increase by providing a DTX compensation method suitable for driving of the touch screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, the display device comprising:
   a panel configured to time-division operate during a first display duration, a first touch duration, a second display duration, and a second touch duration at every frame;
   a touch IC configured to apply a touch scan signal to a plurality of electrodes to allow the panel to perform touch driving during the first and second touch durations; and
   a display driver IC configured to, when the first touch duration of an n+1st frame is started, transfer display information about the second display duration of an nth frame and display information about the first display duration of the n+1st frame to the touch IC, and when the second touch duration of the n+1st frame is started, transfer display information about the first display duration of the n+1st frame and display information about the second display duration of the n+1st frame to the touch IC,
   wherein the touch IC compensates for a touch sensitivity by using transferred display information about the first and second display duration.

2. The display device of claim 1, wherein the touch IC calculates a display-to-touch crosstalk (DTX) level used to compensate for the plurality of electrodes, by using an average value of transferred display information about the first and second display duration, and compensates for the touch sensitivity according to the calculated DTX level.

3. The display device of claim 1, wherein the display driver IC comprises:
   a timing controller configured to receive RGB data from a system to realign the RGB data;
   a data driver configured to convert the realigned RGB data, input from the timing controller, into data voltages to supply the data voltages to a plurality of data lines included in the panel;
   a gate driver configured to sequentially supply a gate signal to a plurality of gate lines included in the panel during the first and second display durations; and
   a memory configured to store the first and second display information.

4. The display device of claim 3, wherein,
   the first display duration is a duration in which the gate signal is applied to odd-numbered gate lines, and
   the second display duration is a duration in which the gate signal is applied to even-numbered gate lines.

5. The display device of claim 3, wherein,
   the first display duration is a duration in which the gate signal is applied to first to nth/2 gate lines, and
   the second display duration is a duration in which the gate signal is applied to (n/2)+1st to nth gate lines.

6. The display device of claim 1, wherein the touch IC receives a plurality of touch sensing signals respectively generated from the plurality of electrodes according to the touch scan signal applied to the plurality of electrodes, and calculates touch coordinates by using received touch sensing signals.

7. The display device of claim 6, wherein during one frame, a touch report rate of each of the touch sensing signals is higher than a display frame rate.

8. A method of driving a display device with integrated touch screen, including: a panel that time-division operates during a first display duration, a first touch duration, a second display duration, and a second touch duration at every frame; a touch IC that applies a touch scan signal to a plurality of electrodes to allow the panel to perform touch driving during the first and second touch durations; and a display driver IC that applies a common voltage to the plurality of electrodes to allow the panel to perform display driving during the first and second display durations, the method comprising:
   when the first touch duration of an n+1st frame is started, by the display driver IC, transferring display information about the second display duration of an nth frame and display information about the first display duration of the n+1st frame to the touch IC;
   during the first touch duration of the n+1st frame, by the touch IC, compensating for a touch sensitivity by using the display information about the second display duration of the nth frame and the display information about the first display duration of the n+1st frame;
   when the second touch duration of the n+1st frame is started, by the display driver IC, transferring display information about the first display duration of the n+1st frame and display information about the second display duration of the n+1st frame to the touch IC; and
   during the second touch duration of the n+1st frame, by the touch IC, compensating for the touch sensitivity by using the display information about the first display duration of the n+1st frame and the display information about the second display duration of the n+1st frame.

9. The method of claim 8, wherein the touch IC calculates a display-to-touch crosstalk (DTX) level used to compensate for the plurality of electrodes, by using an average value of transferred display information about the first and second display duration, and compensates for the touch sensitivity according to the calculated DTX level.

10. The method of claim 9, wherein,
    the first display duration is a duration in which the gate signal is applied to odd-numbered gate lines, and
    the second display duration is a duration in which the gate signal is applied to even-numbered gate lines.

11. The method of claim 9, wherein,
    the first display duration is a duration in which the gate signal is applied to first to nth/2 gate lines, and
    the second display duration is a duration in which the gate signal is applied to (n/2)+1st to nth gate lines.

12. The method of claim 8, wherein the touch IC receives a plurality of touch sensing signals respectively generated from the plurality of electrodes according to the touch scan signal applied to the plurality of electrodes, and calculates touch coordinates by using received touch sensing signals.

13. The method of claim 12, wherein during one frame, a touch report rate of each of the touch sensing signals is higher than a display frame rate.

* * * * *